United States Patent
Cabanier

(10) Patent No.: US 10,095,670 B2
(45) Date of Patent: *Oct. 9, 2018

(54) SYSTEMS AND METHODS FOR EFFICIENT STORAGE OF CONTENT AND ANIMATION

(71) Applicant: Adobe Systems Incorporated, San Jose, CA (US)

(72) Inventor: Henricus Maria Cabanier, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/263,032

(22) Filed: Sep. 12, 2016

(65) Prior Publication Data

US 2016/0378732 A1    Dec. 29, 2016

Related U.S. Application Data

(63) Continuation of application No. 13/553,336, filed on Jul. 19, 2012, now Pat. No. 9,465,882.

(51) Int. Cl.
*G06F 17/00* (2006.01)
*G06F 17/22* (2006.01)
(Continued)

(52) U.S. Cl.
CPC ........ *G06F 17/2247* (2013.01); *G06F 17/211* (2013.01); *G06F 17/24* (2013.01);
(Continued)

(58) Field of Classification Search
CPC .................................................. G06F 17/2247
See application file for complete search history.

(56) References Cited

U.S. PATENT DOCUMENTS 6,121,963 A   9/2000  Ange
7,030,890 B1  4/2006  Jouet et al.
(Continued)

OTHER PUBLICATIONS

"Google Swiffy—FAQ", web page at https://www.google.com/doubleclick/studio/swiffy/faq.html, as available via the Internet and printed Jul. 19, 2012.
(Continued)

*Primary Examiner* — Scott Baderman
*Assistant Examiner* — Barbara Level
(74) *Attorney, Agent, or Firm* — Kilpatrick Townsend & Stockton LLP

(57) ABSTRACT

One embodiment involves receiving, by a web page authoring tool, presentation information in a markup language corresponding to a static graphical object. In this embodiment, the web page authoring tool receives animation information in a data interchange format corresponding to an adjustment for the static graphical object. In this embodiment, the web page authoring tool receives a runtime engine. In this embodiment, the web page authoring tool stores the presentation information, the animation information, and the runtime engine within a web page. The runtime engine may be configured to cause a web browser displaying the web page to render an animation. The animation can be based at least in part on the presentation information and the animation information.

20 Claims, 5 Drawing Sheets

(51) Int. Cl.
  *G06F 17/30* (2006.01)
  *G06F 17/21* (2006.01)
  *G06F 17/24* (2006.01)
  *G06T 13/80* (2011.01)
  *G06T 9/00* (2006.01)

(52) U.S. Cl.
  CPC .. *G06F 17/30896* (2013.01); *G06F 17/30905* (2013.01); *G06T 13/80* (2013.01); *G06T 9/00* (2013.01)

(56) References Cited

U.S. PATENT DOCUMENTS

| | | |
|---|---|---|
| 7,813,910 B1 | 10/2010 | Poulin |
| 7,818,681 B2 | 10/2010 | Abuelsaad et al. |
| 8,091,030 B1 | 1/2012 | Ballagh et al. |
| 8,164,596 B1 | 4/2012 | Bech |
| 8,212,821 B1 | 7/2012 | Kopylov et al. |
| 8,812,946 B1 | 8/2014 | Kopylov et al. |
| 8,849,692 B1 | 9/2014 | Rosenstein et al. |
| 2004/0110490 A1 | 6/2004 | Steele et al. |
| 2005/0097008 A1 | 5/2005 | Ehring et al. |
| 2005/0155027 A1 | 7/2005 | Wei |
| 2005/0223318 A1 | 10/2005 | Diesel et al. |
| 2005/0268216 A1 | 12/2005 | Hayes et al. |
| 2006/0227142 A1 | 10/2006 | Brown et al. |
| 2006/0235984 A1 | 10/2006 | Kraus et al. |
| 2006/0248442 A1 | 11/2006 | Rosenstein et al. |
| 2006/0277477 A1 | 12/2006 | Christenson |
| 2007/0113177 A1 | 5/2007 | Fablet |
| 2007/0260520 A1 | 11/2007 | Jha et al. |
| 2008/0055315 A1 | 3/2008 | Ducharme |
| 2008/0120538 A1 | 5/2008 | Kurz et al. |
| 2009/0055749 A1* | 2/2009 | Chatterjee ........... G06F 3/04817 715/738 |
| 2009/0066702 A1 | 3/2009 | Dion et al. |
| 2009/0138529 A1 | 5/2009 | Bellessort et al. |
| 2009/0172519 A1 | 7/2009 | Xu et al. |
| 2009/0228784 A1 | 9/2009 | Drieu et al. |
| 2009/0265705 A1 | 10/2009 | Wei |
| 2009/0282343 A1 | 11/2009 | Catlin et al. |
| 2009/0315894 A1 | 12/2009 | Goodwin |
| 2010/0045662 A1 | 2/2010 | Boothroyd et al. |
| 2010/0107051 A1 | 4/2010 | Hertenstein |
| 2010/0149091 A1 | 6/2010 | Kota et al. |
| 2010/0153692 A1 | 6/2010 | Kota et al. |
| 2010/0238181 A1 | 9/2010 | Forney et al. |
| 2011/0090258 A1 | 4/2011 | Racic |
| 2011/0173589 A1 | 7/2011 | Guttman et al. |
| 2011/0191676 A1 | 8/2011 | Guttman et al. |
| 2011/0239109 A1 | 9/2011 | Nixon et al. |
| 2012/0056889 A1 | 3/2012 | Carter et al. |
| 2012/0072821 A1 | 3/2012 | Bowling et al. |
| 2012/0079390 A1 | 3/2012 | Ballagh et al. |
| 2012/0117145 A1 | 5/2012 | Clift et al. |
| 2012/0144288 A1 | 6/2012 | Caruso et al. |
| 2012/0185772 A1 | 7/2012 | Kotelly et al. |
| 2012/0236201 A1 | 9/2012 | Larsen et al. |
| 2012/0249870 A1 | 10/2012 | Senster et al. |
| 2012/0256928 A1 | 10/2012 | Chiculita |
| 2013/0002686 A1 | 1/2013 | Kota et al. |
| 2013/0042190 A1 | 2/2013 | Ciloci |
| 2013/0086463 A1 | 4/2013 | Mandal et al. |
| 2013/0097552 A1 | 4/2013 | Villaron et al. |
| 2013/0132818 A1 | 5/2013 | Anders et al. |
| 2013/0132840 A1 | 5/2013 | Blas, Jr. et al. |
| 2013/0223819 A1 | 8/2013 | Sims et al. |
| 2013/0272394 A1 | 10/2013 | Brockmann et al. |
| 2014/0026023 A1 | 1/2014 | Cabanier |
| 2014/0026115 A1 | 1/2014 | Bank et al. |
| 2014/0047413 A1 | 2/2014 | Sheive et al. |
| 2014/0066100 A1 | 3/2014 | Johnson |
| 2014/0089415 A1 | 3/2014 | Huang et al. |
| 2014/0095968 A1 | 4/2014 | Harrop |
| 2014/0101182 A1 | 4/2014 | Roy et al. |
| 2014/0143298 A1 | 5/2014 | Klotzer et al. |
| 2014/0244692 A1 | 8/2014 | Williamson |
| 2014/0289703 A1 | 9/2014 | Mueller et al. |
| 2014/0304379 A1 | 10/2014 | Samaniego et al. |

OTHER PUBLICATIONS

"Google Swiffy—Getting Started", web page at https://www.google.com/doubleclick/studio/swiffy/gettingstarted.html, as available via the Internet and printed Jul. 19, 2012.

"Google Swiffy—Release Notes", web page at https://www.google.com/doubleeclick/studio/swiffy/releasenotes.html, as available via the Internet and printed Jul. 19, 2012.

* cited by examiner

```
tlobject = {
    "width":int
    "height":int
    "frameRate":int
    "objectID":struct
    [
        ... Array of Structures (e.g., 1 per frame) ...
        {
            "depth":int
            {
                "id":int
                "name":string
                "move":real real
                "matrix":real real real real real real
                "restart":1
                "ratio":real
                "alpha":real
            }

"depth":int
            {
                "remove":id
            }

... Repeat for Each Depth ...
        }
    ]

... Repeat for Each Object with a Timeline (Stage and Movie Clips) ...

# SYSTEMS AND METHODS FOR EFFICIENT STORAGE OF CONTENT AND ANIMATION

CROSS-REFERENCE TO RELATED APPLICATIONS

This application claims priority to U.S. patent application Ser. No. 13/553,336, filed, Jul. 19, 2012 entitled "SYSTEMS AND METHODS FOR EFFICIENT STORAGE OF CONTENT AND ANIMATION," the contents of which is incorporated herein by reference in its entirety.

FIELD OF THE INVENTION

This disclosure relates generally to storing information and more particularly relates to the efficient storage of content and animation.

BACKGROUND

Web browsers often vary in their ability to render complex web pages, artwork, and animations. For example, one web browser may support a particular feature while another web browser may not support that particular feature. The varying degrees of support for different technologies and features between web browsers has made developing complex web pages, artwork, and animations difficult for web developers. Traditionally, web developers have addressed these issues by creating simple content or by creating multiple versions of the same content directed specifically to individual web browsers. Accordingly, there is a need for efficient systems and methods for the storage of web pages, artwork, animations, and other content.

SUMMARY

One exemplary embodiment involves a method comprising receiving, by a web page authoring tool, presentation information in a markup language corresponding to a static graphical object. In this exemplary embodiment, the method further comprises receiving, by the web page authoring tool, animation information in a data interchange format corresponding to an adjustment for the static graphical object, the animation information separate from the presentation information. In this exemplary embodiment, the method further comprises receiving, by the web page authoring tool, a runtime engine. In this exemplary embodiment, the method further comprises storing, by the web page authoring tool, the presentation information, the animation information, and the runtime engine within a web page. In some embodiments, the runtime engine is configured to cause a web browser displaying the web page to render an animation. The animation may be based at least in part on the presentation information and the animation information.

In another embodiment, a non-transitory computer-readable medium comprises program code for receiving, by a web page authoring tool, presentation information in a markup language corresponding to a static graphical object; program code for receiving, by the web page authoring tool, animation information in a data interchange format corresponding to an adjustment for the static graphical object, the animation information separate from the presentation information; program code for receiving, by the web page authoring tool, a runtime engine; and program code for storing, by the web page authoring tool, the presentation information, the animation information, and the runtime engine within a web page, wherein the runtime engine is configured to cause a web browser displaying the web page to render an animation, the animation based at least in part on the presentation information and the animation information.

In yet another embodiment, a system comprises an input device; a memory; and a processor in communication with the input device and the memory. In this embodiment, the processor is configured for receiving, by a web page authoring tool, presentation information in a markup language corresponding to a static graphical object; receiving, by the web page authoring tool, animation information in a data interchange format corresponding to an adjustment for the static graphical object, the animation information separate from the presentation information; receiving, by the web page authoring tool, a runtime engine; and storing, by the web page authoring tool, the presentation information, the animation information, and the runtime engine within a web page. In some embodiments, the runtime engine is configured to cause a web browser displaying the web page to render an animation. The animation may be based at least in part on the presentation information and the animation information.

In another embodiment, a method comprises receiving, by a web browser, presentation information in a markup language corresponding to a static graphical object; receiving, by the web browser, animation information in a data interchange format corresponding to an adjustment for the static graphical object, the animation information separate from the presentation information; receiving, by the web browser, a runtime engine configured to cause the web browser to render an animation based at least in part on the presentation information and the animation information; and rendering, by the web browser, the animation.

These illustrative features are mentioned not to limit or define the disclosure, but to provide examples to aid understanding thereof. Additional embodiments are discussed in the Detailed Description, and further description is provided there. Advantages offered by one or more of the embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 5 illustrates pseudocode for an exemplary data structure for animation information according to an embodiment.

DETAILED DESCRIPTION

Figure 1:
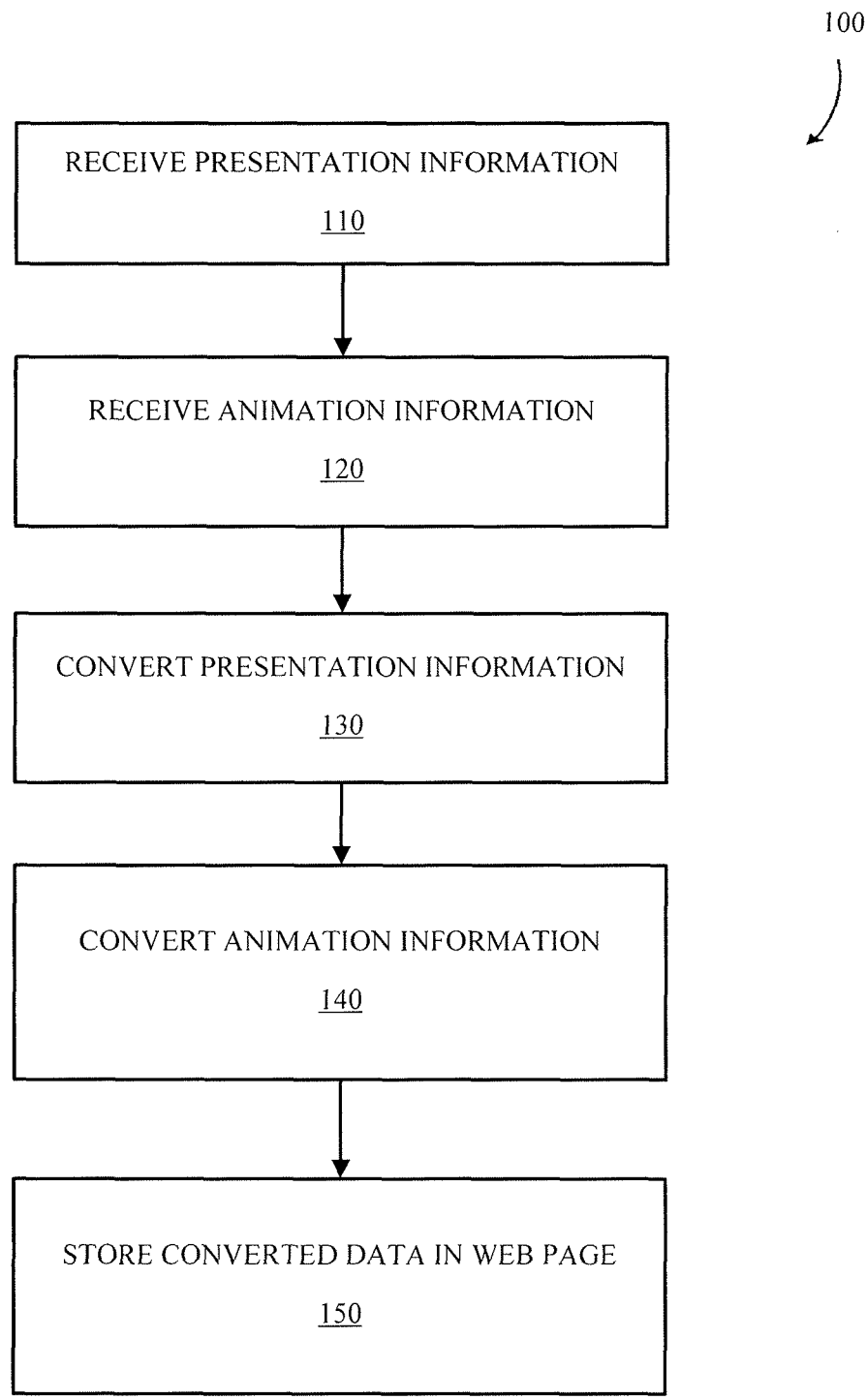
FIG. 1 illustrates a flow chart directed to a method of storing an animation in a web page according to an embodiment.

Systems and methods disclosed herein relate generally to storing animation data in web pages according to an embodiment. For example, FIG. 1 illustrates a flow chart directed to a method 100 of storing an animation in a web page according to an embodiment. Such a method 100 may be performed by one or more electronic devices, such as a server, tablet computer, desktop computer, and/or another suitable computing device.

The method 100 shown in FIG. 1 begins in block 110 when presentation information is received. For example, a web page authoring tool being executed on an electronic device may receive presentational content such as one or more graphics, boxes, gradients, and/or other static content. As another example, a web page authoring tool being executed on an electronic device may receive one or more file locations corresponding to presentational content.

Once the presentation information is received 110, animation information is received 120. The animation information may be separate from the presentation information. For example, in one embodiment, a width, height, and/or frame rate for an animation is received by a web page authoring tool being executed on an electronic device. As another example, information regarding the timing, movement, appearance, disappearance, and/or another event for one or more presentation objects associated with the received presentational content may be received.

After receiving the animation information 120, the presentation information is converted 130. For example, in one embodiment, the presentation information is converted into one or more graphics using a graphical standard, such as Scalable Vector Graphics (SVG), that is supported by numerous different web browsers. As another example, if a JPEG image is received, then a web page authoring tool being executed on an electronic device may convert the JPEG image into an SVG image or another graphical format, such as an HTML canvas element, having cross-browser support.

After converting the presentation information 130, the animation information is converted 140. For example, the received animation information may be converted into JavaScript Object Notation (JSON) by an authoring tool being executed on an electronic device. As another example, adjustment information such as the timing, movement, appearance, disappearance, and/or another event for one or more graphical objects associated with the received presentational content may be converted into JSON, XML, and/or another data-interchange format and/or markup language supported by numerous different web browsers.

Once the animation information is converted 140, the converted data is stored in a web page 150. For example, in one embodiment, the presentation information is converted to a SVG format and the SVG information is stored in the web page. In this embodiment, the XML data associated with the SVG information is stored within and/or referenced by the web page. As another example, if the animation information is converted to JSON, then the JSON information can be stored within and/or referenced by the web page. In this way, the presentation information (e.g., content, graphics, etc.) can be separated from the animation information (e.g., timing, movements, appearances, disappearances, etc.). In some embodiments, the presentation information and/or the animation information is user-editable within at least a web page authoring tool. In one embodiment, the presentation information and/or the animation information is human-readable within at least a web page authoring tool. In embodiments, a web page authoring tool being executed on an electronic device stores the converted presentation information and/or the converted animation information in a web page being authored in the web page authoring tool.

In one embodiment, the web page authoring tool stores a runtime engine and/or a reference to a runtime engine in a web page being authored in the web page authoring tool. For example, the web page authoring tool may store a script, such as JavaScript, for a runtime engine in the web page being authored. As another example, the web page authoring tool may store a reference, such as a URL, to a location corresponding to a runtime engine. In embodiments, the runtime engine enables at least two different types of web browsers to render an animation using the presentation information and the animation information stored within or referenced by the web page. Thus, in embodiments, one or more animations are displayed in substantially the same manner by various web browsers when the web page is rendered. In embodiments, the web page, including one or more animations, can be displayed by numerous types of compatible browsers using at least the stored presentation information and animation information.

These illustrative examples are given to introduce the reader to the general subject matter discussed here and are not intended to limit the scope of the disclosed concepts. The following sections describe various additional embodiments and examples with reference to the drawings in which like numerals indicate like elements. Other embodiments will readily suggest themselves to such skilled persons having the benefit of this disclosure. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related or business-related constraints, or both, and that these specific goals will vary from one implementation to another and from one developer to another.

Illustrative Electronic Device

Figure 2:
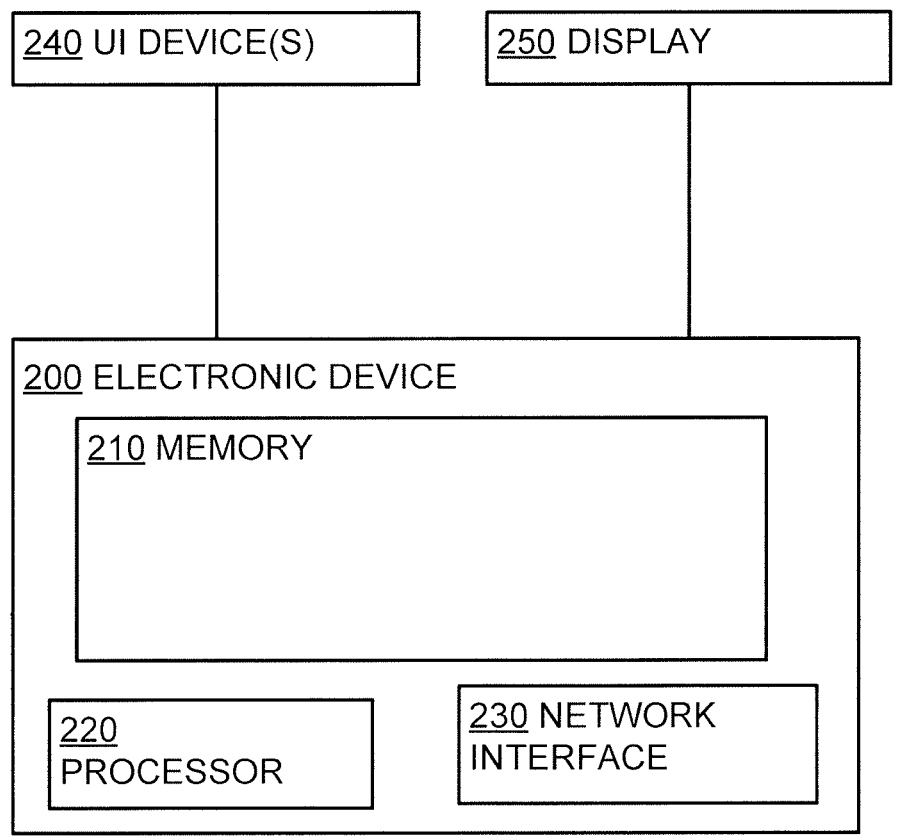
FIG. 2 is a block diagram depicting an exemplary electronic device according to an embodiment.

FIG. 2 is a block diagram depicting an exemplary electronic device according to an embodiment. As shown in FIG. 2, the electronic device 200 comprises a computer-readable medium such as a random access memory (RAM) 210 coupled to a processor 220 that executes computer-executable program instructions and/or accesses information stored in memory 210. A computer-readable medium may comprise, but is not limited to, an electronic, optical, magnetic, or other storage device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. In one embodiment, the electronic device 200 may comprise a single type of computer-readable medium such as random access memory (RAM). In other embodiments, the electronic device 200 may comprise two or more types of computer-readable medium such as random access memory (RAM) and a disk drive. The electronic device 200 may be in communication with one or more external computer-readable mediums such as an external hard disk drive or an external DVD drive.

The embodiment shown in FIG. 2, comprises a processor 220 which executes computer-executable program instructions and/or accesses information stored in memory 210. The instructions may comprise processor-specific instructions generated by a compiler and/or an interpreter from code written in any suitable computer-programming language including, for example, C, C++, C#, Visual Basic, Java, Python, Perl, JavaScript, and ActionScript®. In an embodiment, the electronic device 200 comprises a single processor 220. In other embodiments, the electronic device 200 comprises two or more processors.

The electronic device 200 as shown in FIG. 2 comprises a network interface 230 for communicating via wired or wireless communication. For example, the network interface 230 may allow for communication over networks via Ethernet, IEEE 802.11 (Wi-Fi), 802.16 (Wi-Max), Bluetooth, infrared, etc. As another example, network interface 230 may allow for communication over networks such as CDMA, GSM, UMTS, or other cellular communication networks. The electronic device 200 may comprise two or more network interfaces 230 for communication over one or more networks.

The electronic device 200 may comprise or be in communication with a number of external or internal devices such as a mouse, a CD-ROM, DVD, a keyboard, a display, audio speakers, one or more microphones, or any other input or output devices. For example, the electronic device 200 shown in FIG. 2 is in communication with various user interface devices 240 and a display 250. In one embodiment, electronic device 200 comprises one or more user interface devices 240 and/or display 250. In other embodiments, electronic device 200 is in communication with one or more user interface devices 240 and/or display 250. In still other embodiments, electronic device 200 comprises one or more user interface devices 240 and/or display 250 and is in communication with one or more user interface devices 240 and/or display 250. Display 250 may use any suitable technology including, but not limited to, LCD, LED, CRT, and the like.

Electronic device 200 may be a server, a desktop, a personal computing device, a mobile device, or any other type of electronic devices appropriate for providing one or more of the features described herein.

Illustrative System

Figure 3:
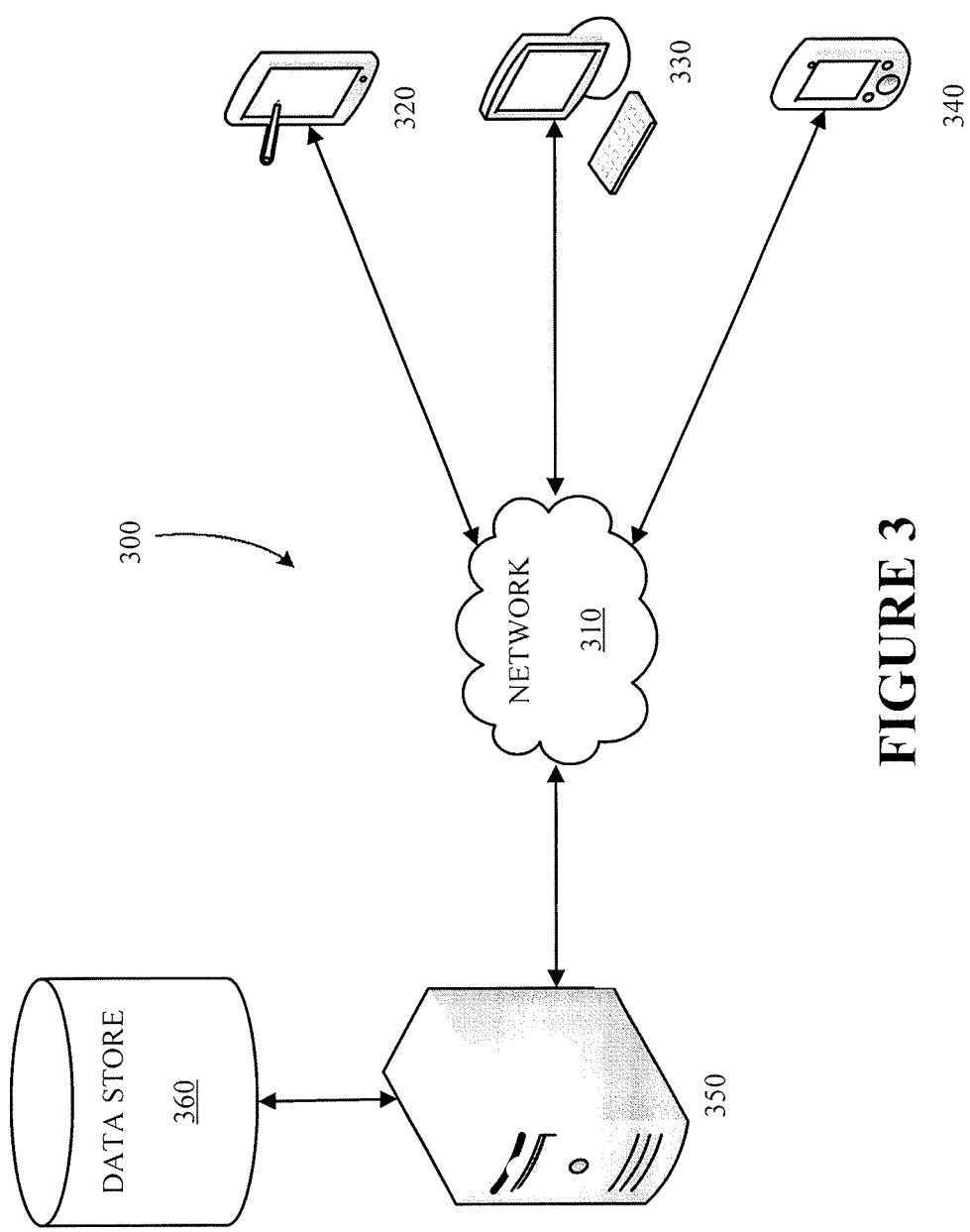
FIG. 3 is a system diagram depicting exemplary computing devices in an exemplary computing environment according to an embodiment.

FIG. 3 illustrates a system diagram depicting exemplary computing devices in an exemplary computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310. Likewise, the web server 350 may send messages to any or all of the electronic devices, 320-340, and may receive messages from any or all of the electronic devices, 320-340, through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), the Internet, an intranet or any combination of hard-wired and/or wireless communication links. In one embodiment, the network 310 may be a single network. In other embodiments, the network 310 may comprise two or more networks. For example, the electronic devices 320-340 may be connected to a first network and the web server 350 may be connected to a second network and the first and the second network may be connected. Numerous other network configurations are disclosed herein and others are within the scope of this disclosure.

An electronic device may be capable of communicating with a network, such as network 310, and be capable of sending and receiving information to and from another device, such as web server 350. For example, in FIG. 3, one electronic device may be a tablet computer 320. The tablet computer 320 may include a touch-sensitive display and be able to communicate with the network 310 by using a wireless network interface card. Another device that may be a electronic device shown in FIG. 3 is a desktop computer 330. The desktop computer 330 may be in communication with a display and be able to connect to the network 330 through a wired network connection. The desktop computer 330 may be in communication with any number of input devices such as a keyboard of a mouse. In FIG. 3, a mobile phone 340 may be an electronic device. The mobile phone 340 may be able to communicate with the network 310 over a wireless communications means such as TDMA, CDMA, GSM, and/or WiFi. Numerous other embodiments are disclosed herein and others are within the scope of this disclosure.

A device receiving a request from another device may be any device capable of communicating with a network, such as network 310, and capable of sending and receiving information to and from another device. For example, in the embodiment shown in FIG. 3, the web server 350 may be a device receiving a request from another device (e.g. electronic devices 320-340) and may be in communication with network 310. A receiving device may be in communication with one or more additional devices, such as additional servers. In one embodiment, a web server may communicate with one or more additional devices to process a request received from an electronic device. For example, web server 350 in FIG. 3 may be in communication with a plurality of additional servers, at least one of which may be used to process at least a portion of a request from any of the electronic devices 320-340 and/or another device. In one embodiment, web server 350 may be part of or in communication with a content distribution network (CDN) that stores data related to one or more web pages, scripts, images, and/or other information.

One or more devices may be in communication with a data store. For example, in FIG. 3, web server 350 is in communication with data store 360. In embodiments, data store 360 is operable to receive instructions from web server 350 and/or other devices in communication with data store 360 and obtain, update, or otherwise process data in response to receiving the instructions. Data store 360 may contain information associated with images, web pages, scripts, and/or other information. Data store 360 shown in FIG. 3 can receive requests from web server 350 and send responses to web server 350. For example, web server 350 may request a particular web page, script, and/or image from data store 360. In response to receiving the request, data store 360 may send the requested information to web server 350. In embodiments, data store 360 can send receive, add, update, or otherwise manipulate information based at least in part on one or more requests received from another device or network, such as web server 350, network 310, or another network or device in communication with data store 360. For example, web server 350 may send a request to data store 360 to update at least a portion of a web page. In response to receiving the request, data store 360 may update source code within the web page such as by updating a link, image, script, reference, text, HTML, and/or other information within the web page and/or associated with the web page.

Method of Storing an Animation

Figure 4:
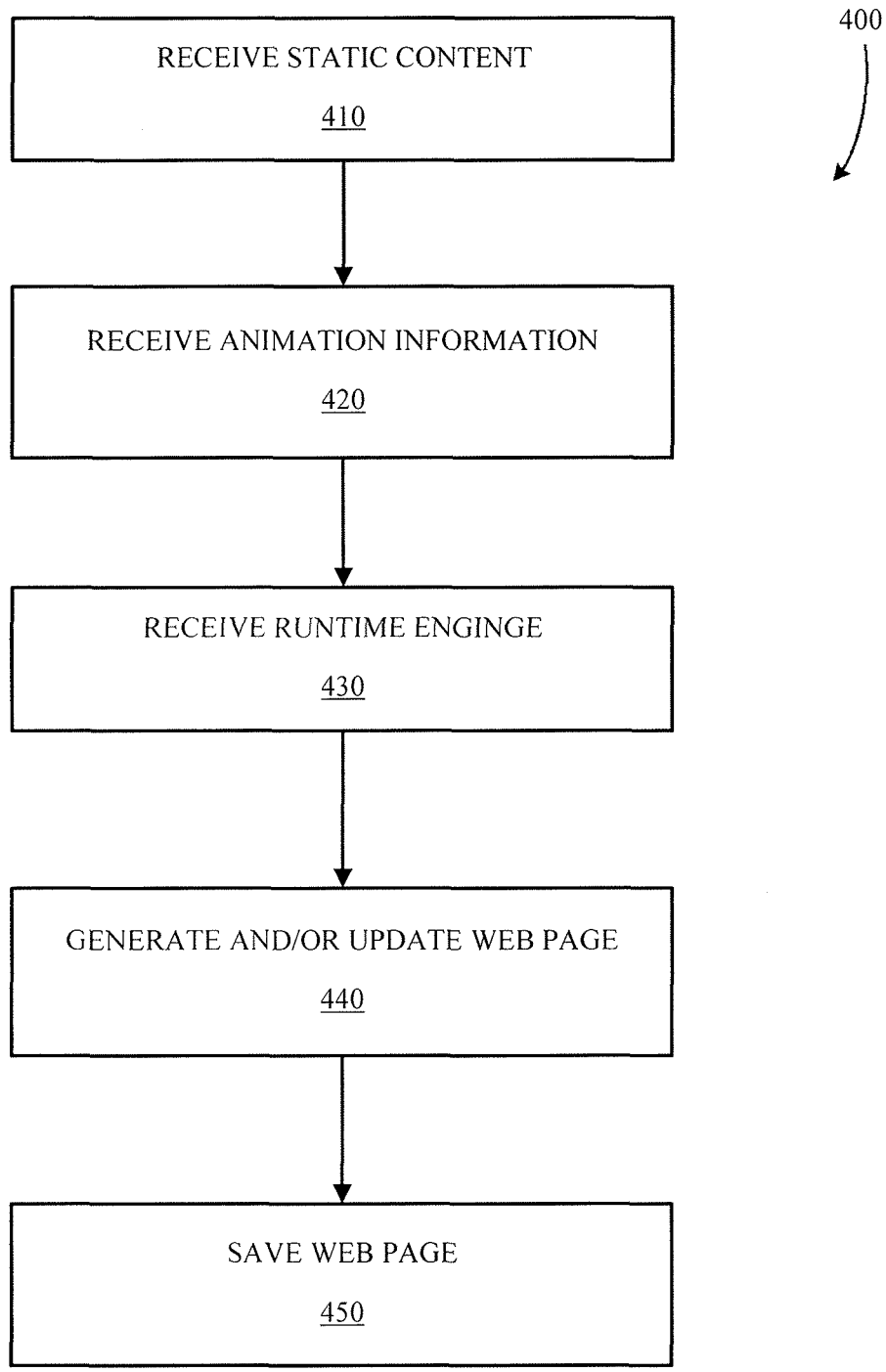
FIG. 4 illustrates a flow chart directed to a method of storing an animation according to an embodiment.

Referring now to FIG. 4, FIG. 4 illustrates a flow chart directed to a method 400 of storing an animation according to an embodiment. The description of the method 400 of FIG. 4 will be made with respect to FIGS. 2 and 3. The description of the method 400 of FIG. 4 will also be made with respect to FIG. 5 which illustrates pseudocode for an exemplary data structure for animation information according to an embodiment.

The method 400 shown in FIG. 4 begins when static content is received 410. Static content may be received in any number of ways. For example, referring to FIG. 2, processor 220 of the electronic device 200 may receive static content—such as a graphic, image, text, box, gradient, background, other presentation information, and/or other static content—from memory 210. In another embodiment, the electronic device 200 may receive static content through network interface 230 or from a hard disk drive or other storage device. In one embodiment, static content is received by a web page authoring tool being executed on processor 220 of the electronic device 200. In this embodiment, the web page authoring tool may receive static content from the memory 210, the network 230, a storage device and/or another device. In an embodiment, a web page authoring tool being executed on processor 220 of the electronic device 200 receives a location corresponding to static content through one or more UI devices 240. For example, the electronic device 200 may receive a URL corresponding to a static graphic. As another example, the electronic device 200 may receive static content through one or more operations such as a copy-and-paste or a cut-and-paste function using a keyboard and/or a mouse associated with the electronic device.

Referring to FIG. 3, an electronic device such as tablet computer 320 may receive static content from web server 350 and/or data store 360 through network 310. For example, a web page authoring tool being executed on a processor of the tablet computer 320 may receive a location or path corresponding to static content. In this embodiment, the tablet computer 320 may send a request through network 310 for the static content at the specified location. In response to sending the request, tablet computer 320 may receive the static content from one or more devices in communication with network 310. For example, tablet computer 320 may receive the static content from web server 350 and/or data store 360 in response to sending a request for the static content.

Static content may be in any number of formats. In one embodiment, the static content is in a tag-based format and/or an XML-based format and/or a markup language. For example, the static content may be a Scalable Vector Graphics (SVG). In one embodiment, the static content is user-editable in a web page authoring tool being executed on a processor of an electronic device, such as electronic device 200 shown in FIG. 2. For example, referring to FIG. 3, if a web page authoring tool being executed on a processor of desktop computer 330 receives a SVG image, then the information associated with the SVG may be human-readable and user-editable at least within the web page authoring tool.

In some embodiments, at least a portion of the static content is converted from a first format into a second format different than the first format. For example, if a JPEG image is received, then the JPEG image may be converted into an SVG image. As another example, if a BMP image is received by a web page authoring tool being executed on a processor of an electronic device 200, then the BMP image may be converted into an SVG image and/or an HTML canvas element. In embodiments, static convent may be in any suitable graphics format such as an HTML canvas element, JPEG, GIF, BMP, or another graphics format. In one embodiment, static content comprises text. In an embodiment, static content can be an image, background, gradient, box text, graphical object, presentation information, or other static information. Numerous other embodiments are disclosed herein and variations are within the scope of this disclosure.

Referring back to FIG. 4, after receiving the static content 410, the method 400 proceeds to block 420. In block 420, animation information is received. In one embodiment, the animation information is separate from the static content and/or presentation information. Animation information may be received in any number of ways. For example, referring to FIG. 2, processor 220 of the electronic device 200 may receive animation information—such as a width, height, and/or frame rate for an animation and/or adjustment information the timing, movement, direction, path, appearance, disappearance, and/or other event(s) for the static content—from memory 210. In another embodiment, the electronic device 200 may receive animation information through network interface 230 or from a hard disk drive or other storage device. In one embodiment, animation information is received by a web page authoring tool being executed on processor 220 of the electronic device 200. In this embodiment, the web page authoring tool may receive animation information from the memory 210, the network 230, a storage device and/or another device. In an embodiment, a web page authoring tool being executed on processor 220 of the electronic device 200 receives a location corresponding to animation information through one or more UI devices 240. For example, the electronic device 200 may receive a URL corresponding to a file containing animation information. The electronic device 200 may receive animation information through one or more user input devices. For example, a web page authoring tool being executed on processor 220 of the electronic device 200 may receive input from a mouse and/or keyboard associated with the electronic device 200 indicating a time that the static content should appear and/or disappear. In other embodiments, the web page authoring tool may receive timing, movement, appearance, disappearance, events, actions to perform when an event occurs, and/or other animation information.

Referring to FIG. 3, an electronic device such as tablet computer 320 may receive animation from web server 350 and/or data store 360 through network 310. For example, a web page authoring tool being executed on a processor of the tablet computer 320 may receive a location or path corresponding to a file containing animation information. In this embodiment, the tablet computer 320 may send a request through network 310 for the animation information at the specified location. In response to sending the request, tablet computer 320 may receive the animation information from one or more devices in communication with network 310. For example, tablet computer 320 may receive the animation information from desktop computer 320, web server 350, and/or data store 360 in response to sending a request for the animation information. In other embodiments, the tablet computer 320 receives animation information from another device, such as desktop computer 330, in response to a user input to an input device associated with the other device. For example, tablet computer 320 may receive animation information in response to a user interacting with a mouse or keyboard associated with desktop computer 330.

Animation information may be in any number of formats. In one embodiment, the animation information is in a data-interchange format. For example, the animation information may be in JavaScript Object Notation (JSON). In another embodiment, the animation information is in a tag-based format and/or an XML-based format and/or a markup language. For example, the animation information may be in XML. In one embodiment, the animation information is user-editable in a web page authoring tool being executed on a processor of an electronic device, such as electronic device 200 shown in FIG. 2. For example, referring to FIG. 3, if a web page authoring tool being executed on a processor of desktop computer 330 receives animation information in JSON, then the text associated with the received animation information may be human-readable and user-editable at least within the web page authoring tool. In other embodiments, a web page authoring tool being executed on a processor of an electronic device 200 receives input from an input device associated with the electronic device and the input corresponds to the animation information. In this embodiment, the web page authoring tool may create animation information in a suitable format. For example, if the input received from the input device, indicates that an image should appear at a particular time in an animation, then the web page authoring tool may create animation information having a JSON format that specifies that the image should appear that the particular time. Numerous other embodiments are disclosed herein and variations are within the scope of this disclosure.

In some embodiments, at least a portion of the animation information is converted from a first format into a second format different than the first format. For example, if the received animation information is in a tag-based format such as XML, then the animation information may be converted into JSON. In other embodiments, if the received animation information is in JSON, then the animation information may be converted into XML. Numerous other conversions are within the scope of this disclosure.

In one embodiment, the animation information is received in a particular format or converted into the particular format. For example, FIG. 5 illustrates pseudocode for an exemplary data structure for animation information according to an embodiment. In the embodiment shown in FIG. 5, a width, height, and frame rate associated with an animation is specified. For example, a number of pixels for the width of an animation, a number of pixels for the height of the animation, and a number of frames per second for the animation may be specified. Furthermore, in the embodiment shown in FIG. 5, the objectID structure provides timeline data for an object ObjectID. In one embodiment, the objectID is an integer where 0 indicates a main stage and other integers indicate movie clips. In the embodiment shown in FIG. 5, an array of structures corresponding to frames for an animation are shown. For example, in one embodiment, one structure is created for each frame of an animation. In other embodiments, structures are created for at least a portion of the frames of an animation. In the embodiment shown in FIG. 5, the "depth" value indicates the depth of an object being added. In this embodiment, the "id" corresponds with a particular piece of static content, such as a particular graphical object. As shown in FIG. 5, information associated with objects at particular depths can indicate when an object should be added, removed, moved, and/or other actions. Numerous other formats and/or structures are disclosed herein and variations are within the scope of this disclosure.

Referring back to FIG. 4, after animation information is received 420, the method 400 proceeds to block 430. In block 430 a runtime engine is received. A runtime engine may be received in any number of ways. For example, referring to FIG. 2, processor 220 of the electronic device 200 may receive a runtime engine from memory 210. In another embodiment, the electronic device 200 may receive a runtime engine through network interface 230 or from a hard disk drive or other storage device. In one embodiment, a runtime engine is received by a web page authoring tool being executed on processor 220 of the electronic device 200. In this embodiment, the web page authoring tool may receive a runtime engine from the memory 210, the network 230, a storage device and/or another device. In one embodiment, the web page authoring tool specifies one or more one runtime engines. For example, a web page authoring tool may receive a list of web browsers for which an animation should be compatible. In this embodiment, the web page authoring tool may determine one or more runtime engines to use. The web page authoring tool may contain a library of runtime engines.

In one embodiment, the web page authoring tool comprises or is able to locate a runtime engine that operates across two or more different types of web browsers. For example, the web page authoring tool may be able to access a JavaScript runtime engine that is configured to cause a web browser displaying a web page containing the presentation information and the animation information to render an animation associated with the presentation information and the animation information. In embodiments, the runtime engine is designed to operate across multiple versions of a particular type of web browser such as multiple versions of Internet Explorer. In some embodiments, the runtime engine is designed to operate across multiple types of web browsers such as Internet Explorer, Chrome, Safari, Firefox, and/or other web browsers. In this way, the runtime engine may be used by various web browsers to consistently render an animation associated with the presentation information and the animation information.

In an embodiment, a web page authoring tool being executed on processor 220 of the electronic device 200 receives a location corresponding to a runtime engine through one or more UI devices 240. For example, the electronic device 200 may receive a URL corresponding to a file containing a runtime engine. The electronic device 200 may receive a runtime engine through one or more user input devices associated with the electronic device.

Referring to FIG. 3, an electronic device such as tablet computer 320 may receive a runtime engine from web server 350 and/or data store 360 through network 310. For example, a web page authoring tool being executed on a processor of the tablet computer 320 may receive a location or path corresponding to a file containing a runtime engine. In this embodiment, the tablet computer 320 may send a request through network 310 for the runtime engine at the specified location. In response to sending the request, tablet computer 320 may receive the runtime engine from one or more devices in communication with network 310. For example, tablet computer 320 may receive the runtime engine from desktop computer 320, web server 350, and/or data store 360 in response to sending a request for the runtime engine. In other embodiments, the tablet computer 320 receives a runtime engine from another device, such as desktop computer 330, in response to a user input to an input device associated with the other device. For example, tablet computer 320 may receive a runtime engine in response to a user interacting with a mouse or keyboard associated with desktop computer 330 to select a runtime engine from a plurality of available runtime engines.

A runtime engine may be in any number of formats and/or written in any number of languages. In one embodiment, the runtime engine comprises a single JavaScript file. In another embodiment, the runtime engine comprises two or more JavaScript files. In yet other embodiments, a runtime engine may be written in another programming language such a C, C++, or any other suitable programming language. The runtime engine may allow one or more applications to render an animation based at least in part on presentation information, such as a static graphic, and animation information, such as timing, movements, and/or events associated with the static graphic. In one embodiment, the animation information comprises a frame rate, and the animation rendered by an application using the runtime engine is based at least in part on the frame rate. Numerous other embodiments are disclosed herein and variations are within the scope of this disclosure.

Referring back to FIG. 4, after receiving a runtime engine 430, the method 400 proceeds to block 440. In block 440, a web page is generated and/or updated. For example, a web page authoring tool being executed on a processor of the tablet computer 320 may generate a web page. As another example, a web page authoring tool being executed on a processor of the desktop computer 330 may update a web page being edited in the web page authoring tool. In one embodiment, the generated and/or updated web page includes or references the static content, animation information, and/or the runtime engine. The static content (e.g., presentation information) may be separate from the animation information within the web page. For example, in an embodiment, the generated and/or updated web page includes HTML. The static content may be included in the web page as SVG images. In this embodiment, one or more SVG images may be wrapped in a DIV element having an identification corresponding with animation information that is included in the web page. The animation information may be included as JSON in a JavaScript section of the of the web page using the structure specified in FIG. 5 or another suitable structure. In addition, the updated and/or generated web page may include the runtime engine. For example, the updated and/or generated web page may include JavaScript that enables the animation to be rendered in compatible web browsers using the static content and animation information within the web page. In other embodiments, the generated and/or updated web page reference and/or other identify a location from which a runtime engine, static content, and/or animation information can be retrieved. In some embodiments, the presentation information and/or the animation information is user-editable within at least a web page authoring tool. In one embodiment, the presentation information and/or the animation information is human-readable within at least a web page authoring tool. In embodiments, the generated and/or updated web page may include one or more of the following languages or formats, including but not limited to: ActionScript®, AJAX, ASP, C, C++, Flash®, HTML, JAVA, JavaScript, JSON, MXML, PHP, XML, and/or XSLT. Numerous other embodiments are disclosed herein and variations are within the scope of this disclosure.

Referring back to FIG. 4, after generating and/or updating the web page 440, the method 400 proceeds to block 450. In block 450, the web page is saved. The web page can be saved in an number of ways. In one embodiment, referring to FIG. 2, the processor 220 of the electronic device 200, stores the web page in the memory 210. In another embodiment, the processor 220 of the electronic device 200, stores the web page in one or more storage mediums such as a hard disk drive, flash drive, or another suitable storage device. In another embodiment, the electronic device 200 stores the web page to another device through the network interface 230. For example, referring to FIG. 3, tablet computer 320 may store the web page at web server 350 and/or data store 360 through network 310. The tablet computer 320 may send the web page to the web server 350 in response to receiving a request from the web server and/or another computing device in communication with the tablet computer 320. In other embodiments, the tablet computer 320 pushes the web page to the web server 350 and/or data store 360 without receiving a request from another device.

The web page may be stored by a web page authoring tool application being executed on the electronic device 200. For example, referring to FIG. 2, the memory 210 may have program code stored thereon for a web page authoring tool. In this embodiment, the processor 220 may receive program code for the web page authoring tool from memory 210 and execute at least a portion of the program code for the web page authoring tool application. In another embodiment, the processor 220 receives program code for a web page authoring tool from another device through the network interface 230. For example, referring to FIG. 3, tablet computer 320 may receive program code for a web page authoring tool stored at web server 350 and/or data store 360 through network 310. In this embodiment, the web page authoring tool may contain instructions that cause the web page to be stored in one or more storage devices.

In embodiments, a web page may be stored in any number of formats or written in any number of languages. A web page may be written in a declarative language. For example, a web page may contain information in a tag-based format. A web page may be written in a procedural language. In embodiments, a web page may be written in a combination of declarative languages, procedural languages, or both. In various embodiments, a web page may be in one or more of the following languages, including but not limited to: ActionScript®, ASP, C, C++, HTML, JAVA, JavaScript, JSON, MXML, PHP, XML, or XSLT. Furthermore, a web page may be stored in one or more text files. In embodiments, a web page may be stored in one or more data stores. A web page may be in an archive or compressed format, or both, such as JAR, ZIP, RAR, ISO, or TAR. A combination of languages, formats, and/or data stores may be used to define a web page according to various embodiments. Numerous other embodiments are disclosed herein and variations are within the scope of this disclosure.

General

Numerous specific details are set forth herein to provide a thorough understanding of the claimed subject matter. However, those skilled in the art will understand that the claimed subject matter may be practiced without these specific details. In other instances, methods, apparatuses or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

That which is claimed:

1. A method comprising:
   receiving, by a web page authoring tool hosted on a computing device, presentation information for a static graphical object to be rendered in a web page;
   receiving, by the web page authoring tool, animation information for an animation of the static graphical object in the web page, the animation information received separately from the presentation information;
   converting, by the web authoring tool, the presentation information to a first format and the animation information to a second format different from the first format; and
   updating, by the web authoring tool, the web page to store separately or reference separately the presentation information in the first format, the animation information in the second format, and a runtime engine, wherein the runtime engine is executed upon a rendering of the updated web page in a web browser, wherein executing the runtime engine causes a presentation of the static graphical object based on the presentation information in the first format and causes the animation of the presentation based on the animation information in the second format.

2. The method of claim 1, wherein the first format is a markup language, and wherein the second format is a data interchange format.

3. The method of claim 1, further comprising identifying, by the web authoring tool, a list of types or versions of web browsers usable to render the web page on the computing device, wherein the runtime engine is selected by the web authoring tool based on the list of web browsers.

4. The method of claim 3, wherein the runtime engine is selected from potential run time engines based on a determination that the runtime engine is compatible with each browser in the list of browsers.

5. The method of claim 1, wherein the animation information comprises a frame rate, and wherein the runtime engine is selected, by the web authoring tool, from potential run time engines based on the frame rate.

6. The method of claim 1, wherein the presentation information is received from a web server communicatively coupled with the computing device based on a request for the presentation information from the computing device to the web authoring tool.

7. The method of claim 6, wherein the animation information is received from the web server based on a separate request from the computing device to the web authoring tool.

8. The method of claim 1, further comprising:
   selecting, by the web authoring tool, the runtime engine from potential runtime engines;
   requesting, by the web authoring tool, the runtime engine from a web server communicatively coupled with the computing device; and
   receiving, by the web authoring tool from the web server, the runtime engine or a network address of the runtime engine.

9. A non-transitory computer-readable storage medium comprising instructions that, upon execution by a processor of a computer, cause the computer to perform operations comprising:

running a web page authoring tool configured to generate or edit a web page;

receiving, by the web page authoring tool, presentation information for a static graphical object to be rendered in the web page;

receiving, by the web page authoring tool, animation information for an animation of the static graphical object in the web page, the animation information received separately from the presentation information;

converting, by the web authoring tool, the presentation information to a first format and the animation information to a second format different from the first format; and updating, by the web authoring tool, the web page to store separately or reference separately the presentation information in the first format, the animation information in the second format, and a runtime engine, wherein the runtime engine is executed upon a rendering of the updated web page in a web browser, wherein executing the runtime engine causes a presentation of the static graphical object based on the presentation information in the first format and causes the animation of the presentation based on the animation information in the second format.

10. The non-transitory computer-readable storage medium comprising of claim 9, wherein the static graphics object comprises a text or an image, wherein first format is a scalable graphics vector (SVG) format such that the text or the image is converted to a SVG object.

11. The non-transitory computer-readable storage medium comprising of claim 10, wherein the animation information comprises an adjustment to the text or the image, wherein second format is a JavaScript Object Notation (JSON) format such that the adjustment is converted to a JSON file.

12. The non-transitory computer-readable storage medium comprising of claim 9, wherein updating the web page comprises:

storing first source code corresponding to the converted presentation information within the web page;

storing second source code corresponding to the converted animation information within the web page; and storing third source code corresponding to a location of the runtime engine within the web page, wherein the runtime engine is compatible with at least a first web browser type and a second web browser type different from the first web browser type.

13. The non-transitory computer-readable storage medium comprising of claim 9, wherein the animation information is received in an original format, and wherein the animation information, when presented based on the original format, is human-readable and user-editable within the web page authoring tool and, when presented based on the second format, is not human-readable and user-editable within the web page authoring tool.

14. The non-transitory computer-readable storage medium comprising of claim 9, wherein the presentation information is received from local storage of the computer in a graphics format and is converted to a Scalable Vector Graphics (SVG) format, wherein the animation presentation is received via a user interface of the web authoring application, comprises user-defined animation parameters for the animation of the static graphical object, and is converted to a JavaScript Object Notation (JSON) format.

15. The non-transitory computer-readable storage medium comprising of claim 9, wherein the runtime engine is selected from a local library of the web authorizing tool based on user input at the computer specifying types or versions of web browsers, wherein the runtime engine is selected by the web authoring tool from potential runtime engines in the library based on a determination that the runtime engine is compatible with the web browsers.

16. A computer system comprising:

a processor; and a memory comprising computer-readable instructions that, upon execution by the processor, cause the computer system to at least:

run a web page authoring tool configured to generate or edit a web page;

receive, by the web page authoring tool, presentation information for a static graphical object to be rendered in the web page;

receive, by the web page authoring tool, animation information for an animation of the static graphical object in the web page, the animation information received separately from the presentation information;

convert, by the web authoring tool, the presentation information to a first format and the animation information to a second format different from the first format; and update, by the web authoring tool, the web page to store separately or reference separately the presentation information in the first format, the animation information in the second format, and a runtime engine, wherein the runtime engine is executed upon a rendering of the updated web page in a web browser, wherein executing the runtime engine causes a presentation of the static graphical object based on the presentation information in the first format and causes the animation of the presentation based on the animation information in the second format.

17. The computer system of claim 16, further comprising a web server and a computing device, wherein the web page authoring tool is hosted on the web server and is executed on the computing device as an instance, and further comprising: storing, by the web page authoring tool, the edited web page at the web server.

18. The computer system of claim 17, wherein the presentation information is received from local storage of the computing device and comprises user-defined animation parameters for the animation of the static graphical object, and wherein the user-defined animation parameters comprise at least one of: timing, movement, appearance, disappearance, events, actions, width, height, or gram rate for the animation of the static graphical object.

19. The computer system of claim 16, further comprising a computing device and a web server, wherein the web authoring application is executed on the computing device, wherein the presentation information is received from a remote device, wherein the animation presentation is received from the computing device, and wherein the updated web page is stored at the web server.

20. The computer system of claim 16, further comprising a computing device and a web server, wherein the web authoring application is executed on the computing device, wherein the presentation information and the animation presentation are received from the web server based on respective requests from the computing device to the web server, and wherein the updated web page is stored at the web server.

* * * * *